United States Patent
Kahn

[15] 3,684,838
[45] Aug. 15, 1972

[54] SINGLE CHANNEL AUDIO SIGNAL TRANSMISSION SYSTEM

[72] Inventor: Leonard R. Kahn, Freeport, N.Y.

[73] Assignee: Kahn Research Laboratories, Inc., Freeport, L. I., N.Y.

[22] Filed: March 15, 1971

[21] Appl. No.: 124,406

Related U.S. Application Data

[63] Continuation of Ser. No. 740,173, June 26, 1968, abandoned.

[52] U.S. Cl. ..................179/15.55 R, 325/32, 325/49
[51] Int. Cl. ..................H04b 1/66
[58] Field of Search ......325/59, 61, 32, 49; 343/200; 332/41; 179/15.55 R

[56] References Cited

UNITED STATES PATENTS

| | | | |
|---|---|---|---|
| 1,749,045 | 3/1930 | Nyquist | 325/59 |
| 2,576,115 | 11/1951 | Hill | 325/59 |
| 2,766,325 | 10/1956 | DiToro | 179/15.55 R |

*Primary Examiner*—Robert L. Richardson
*Attorney*—Albert F. Kronman

[57] ABSTRACT

A system and method for transmitting relatively high fidelity audio signals (e.g., speech and music signals having frequencies from about 100 cps to about 3,000 cps or higher) across an audio signal transmission channel characterized by a passband which effectively transmits only a portion of the frequency components making up the audio signals (e.g., a telephone line with a passband of about 300–3,000 cps or higher, or a radio frequency carrier wave restricted to a comparable low fidelity signal modulation, for example). In the preferred embodiment of the invention, a relatively narrow-sub-band of frequencies are blocked from the frequency spectrum of the signal to be transmitted in a range (e.g., about 2.1 – 2.275 kcs) where the effect of such blocking cannot be perceived by a listener at the receiving station. The signal components in a lower frequency range (e.g., about 100 – 275 cycles) which have a significant effect on the naturalness of the audio signal ultimately heard at the receiving station are translated in frequency to derive a frequency-displaced signal falling within the frequency range of the blocked sub-band, and combined with the remainder of the audio signal. The resultant signal is then transmitted across the relatively low fidelity transmission channel. At the receiving station the frequency-displaced portion of the signal is isolated from the remainder of the transmitted signal, restored to its original frequency range and re-combined with the remainder of the signal to substantially re-establish the original signal, less only the insignificant blocked frequency sub-band.

In a modified embodiment of the invention, substantially the entire audio signal is translated upwardly in frequency by an increment of 200 cps, for example, to derive a frequency-displaced signal prior to transmission of the signal. All but the highest frequency components of the translated signal thus fall within the passband of the relatively low fidelity transmission channel. Such frequency-displaced signal is then transmitted across the low fidelity channel and is restored to its original frequencies at the receiving station.

7 Claims, 5 Drawing Figures

INVENTOR
LEONARD R. KAHN
BY Graybeal, Cole & Barnard
ATTORNEYS

INVENTOR
LEONARD R. KAHN
BY Graybeal, Cole & Barnard
ATTORNEYS

SINGLE CHANNEL AUDIO SIGNAL TRANSMISSION SYSTEM

RELATED APPLICATION

This application is a continuation of applicant's application Ser. No. 740,173 filed June 26, 1968, entitled Single Channel Audio Signal Transmission System (now abandoned).

Applicant's U.S. application Ser. No. 652,519, entitled Audio Signal Transmission System and Method, and filed July 11, 1967 (now abandoned), discloses a system and method for processing such high fidelity audio signals and transmitting them across two of such low fidelity transmission channels.

BACKGROUND OF THE INVENTION

The present invention relates generally to improvements in the field of audio signal transmission. More particularly, this invention provides an improved system and method for transmitting relatively high fidelity audio signal across a single, relatively low fidelity transmission channel characterized by a passband which cannot effectively transmit all of the frequency components making up such relatively high fidelity audio signal.

High fidelity transmission channels (channels capable of effectively transmitting electrical signals throughout the audio range) are often unavailable, too expensive or otherwise impractical for use in certain situations where relatively low fidelity transmission channels (e.g., telephone lines or radio frequency carrier waves which are restricted to low fidelity signal modulation) are available. However, such low fidelity channels have not been utilized in transmitting high fidelity audio signals (e.g. speech and music signals having frequencies between about 100 cps and 3,000 cps or greater) because they are not capable of effectively transmitting signal components in the low frequency range (e.g., below about 300 cps), and such low frequency components are necessary to preserve the naturalness of the audio signal ultimately heard at the receiving station.

Patent No. 1,749,045, issued to Nyquist et al, discloses a system wherein low frequencies in a telegraph signal are raised in frequency to a value that is above the normal frequency band used for transmission. The high frequency waves are then applied to the transmission line and, after reception at a receiver unit, they are again changed in frequency to their original band. The Nyquist system is not practical for high fidelity transmission because the high frequency portion of the band is subject to large variations in gain and distortion which affect the translated low frequencies. In addition, there is considerable noise always present in the upper frequency range. Nyquist requires a transmission band in which there is room to receive the high frequencies at the top of the band.

The present invention selects an intermediate portion of the normal telephone transmission band (less than one fifth of an octave), blocks this band, and inserts the low frequency energy which has been converted to the high band frequencies. Following transmission the intermediate frequency is translated back to its original frequency. The result is a voice transmission which has increased frequency range in which the blocked intermediate portion is not missed and which is not subject to the noise and transmission errors of prior art systems.

SUMMARY OF THE INVENTION

It is a primary object of the present invention to provide an audio signal transmission system effectively transmitting relatively high fidelity audio signals across a single, relatively low fidelity transmission channel characterized by a passband which effectively transmits less than all of the frequency components making up such high fidelity audio signals.

The foregoing object is realized by the system of the present invention by translating the low frequency components of the high fidelity audio signal below the transmission channel passband into a frequency-displaced signal falling substantially within the passband of the low fidelity transmission channel, and transmitting such frequency-displaced signal along with at least most of the remainder of the audio signal. At the receiving station the frequency-displaced signal is restored to its original frequency range. The low frequency components (e.g. 100–275 cps components) of the audio signal thus reproduced significantly contribute to the naturalness of the signal as heard at the receiving station.

In the preferred embodiment of the invention, a relatively narrow sub-band of frequencies within the passband of the low fidelity transmission channel is blocked from the signal to be transmitted, and the low frequency components of the audio signal are translated in frequency to derive a signal falling within the blocked sub-band of frequencies. The blocked sub-band of frequencies within the passband of the transmission channel is selected so that the loss of such components is not aurally discernible in the signal output at the receiving station. The blocked sub-band permits the transmission of the up-shifted low frequency components of the original signal which are very important to the naturalness of the audio signal as reproduced at the receiving station.

At the receiving station, the frequency displaced portion of the transmitted signal is restored to its original frequency range and recombined with the remainder of the signal to substantially reproduce the original high fidelity audio signal, less only the insignificant blocked sub-band of frequencies.

In a modified embodiment, substantially the entire high fidelity audio signal to be transmitted is upwardly translated at the transmitting station to derive a signal, the significant low frequency components of which fall within the passband of the relatively low fidelity transmission channel to which the signal is applied. At the receiving station the signal is restored to its original frequency range.

DESCRIPTION OF THE PREFERRED EMBODIMENTS

Figure 1:
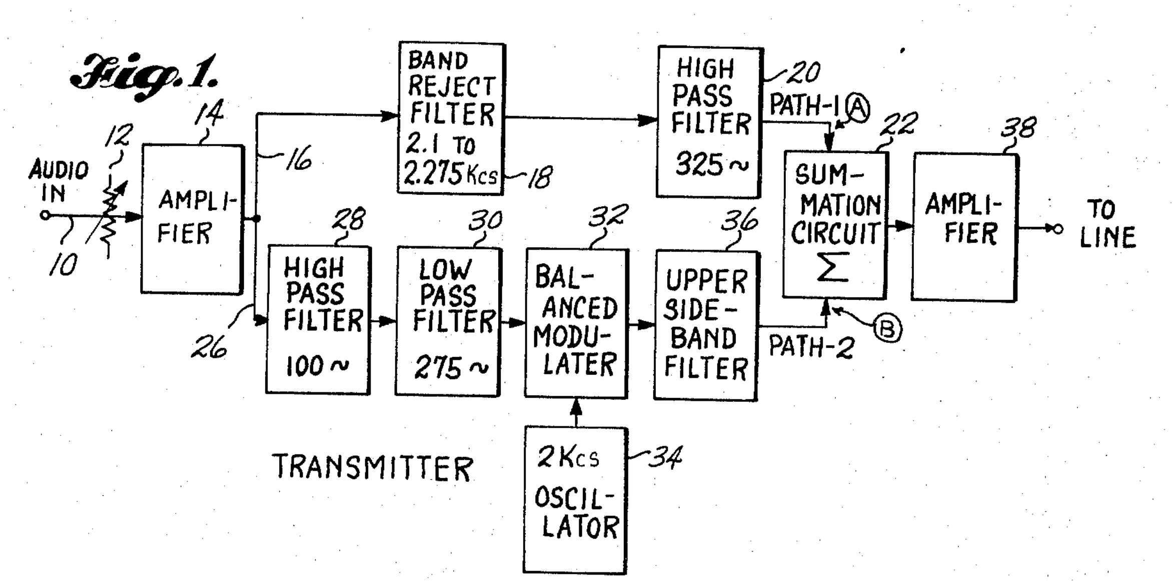
FIG. 1 is a block diagram of a preferred form of a transmitting system constructed in accordance with the teachings of the present invention.

The transmitter system shown in FIG. 1 is designed to process a relatively high fidelity audio input signal for transmission across a relatively low fidelity transmission channel characterized by a passband effectively transmitting less than all of the frequency components making up the high fidelity input signal. For example, the input signal may be voice and/or music signals which typically include components having frequencies between about 100 cps and 3,000 cps or more, and the transmission channel may be a conventional telephone line having a passband of 300 cps to 3,000 cps, for example.

As shown in FIG. 1, the transmitter circuitry comprises a variable attenuator 12 and an amplifier 14 which receives an audio input signal 10, from a suitable audio signal source (not shown). Following the amplifier 14, the transmitting circuit is divided into two branches, designated 16 and 26 for discussion purposes. The first branch 16 includes a band reject filter 18 that blocks a sub-band of frequencies of the input signal within the passband of the transmission channel employed. Preferably, the blocked sub-band of frequencies falls within the mid-upper frequency range (e.g., at about 2.1 to 2.275 kcs), where the loss of the blocked band will not be perceptible to the ultimate listener. It should be understood that the band reject filter 18 can be selected to block a bandwidth at any appropriate point in the frequency range of the input signal, and that in general the higher the frequency range of the blocked bandwidth the less noticeable the loss will be to the ultimate listener. However, if the frequency range of the blocked bandwidth is too high and a very low fidelity transmission channel is employed, the channel will not effectively transmit the low frequency portion of the signal which is frequency displaced in the other branch 26 (as discussed below) to occupy the blocked sub-band.

Also included in the branch 16 is a high pass filter 20 which receives the output from the band reject filter 18 and passes only components having frequencies above a predetermined level (e.g., about 325 cps). It is desirable to block these low frequency components to prevent undesirable heterodyne or "beat" signals and other signal degradation which can otherwise appear if such components are permitted to pass through both branches 16 and 26. The output of branch 16 feeds a conventional summation circuit 22.

In the second branch 26, a high pass filter 28 and a low pass filter 30, in series, function to pass only signal components in a relatively low frequency range (e.g., between about 100 and 275 cps). The high and low pass filters 28 and 30 provide relatively sharp selectivity, but may not always be necessary since the sideband filter 36 in the branch 26 can provide the desired attenuation. The output from the low pass filter 30 feeds a balanced modulator 32 which also receives a carrier wave input (e.g., at 2 kcs) from a local oscillator 34. The output from the modulator 32 is a double-sideband, suppressed carrier wave which is fed to an upper sideband filter 36. The upper sideband filter 36 passes the upper sideband and attenuates the lower sideband to produce an output signal having a frequency range between about 2.1 and 2.275 kcs. The output signal from the upper sideband filter 36 is fed to the summation circuit 22 which also receives the output signal from branch 26. An amplifier 38 receives the output signal from the summation circuit 22 and amplifies it to an appropriate level for transmission across the low fidelity transmission line.

At the receiving station, the transmitted audio signal input 40 is fed through a variable attenuator 42 and an amplifier 44 to two branches, designated 46 and 52. In the first branch 46 the signal is fed to a band reject filter 48 which blocks the frequency components between about 2.05 and 2.35 kcs. Thus, the output from the band reject filter 48 includes components having frequencies from about 325 cps to about 2.05 kcs, and from about 2.35 kcs to the upper frequency limit of the transmission line.

Figures 2, 3:
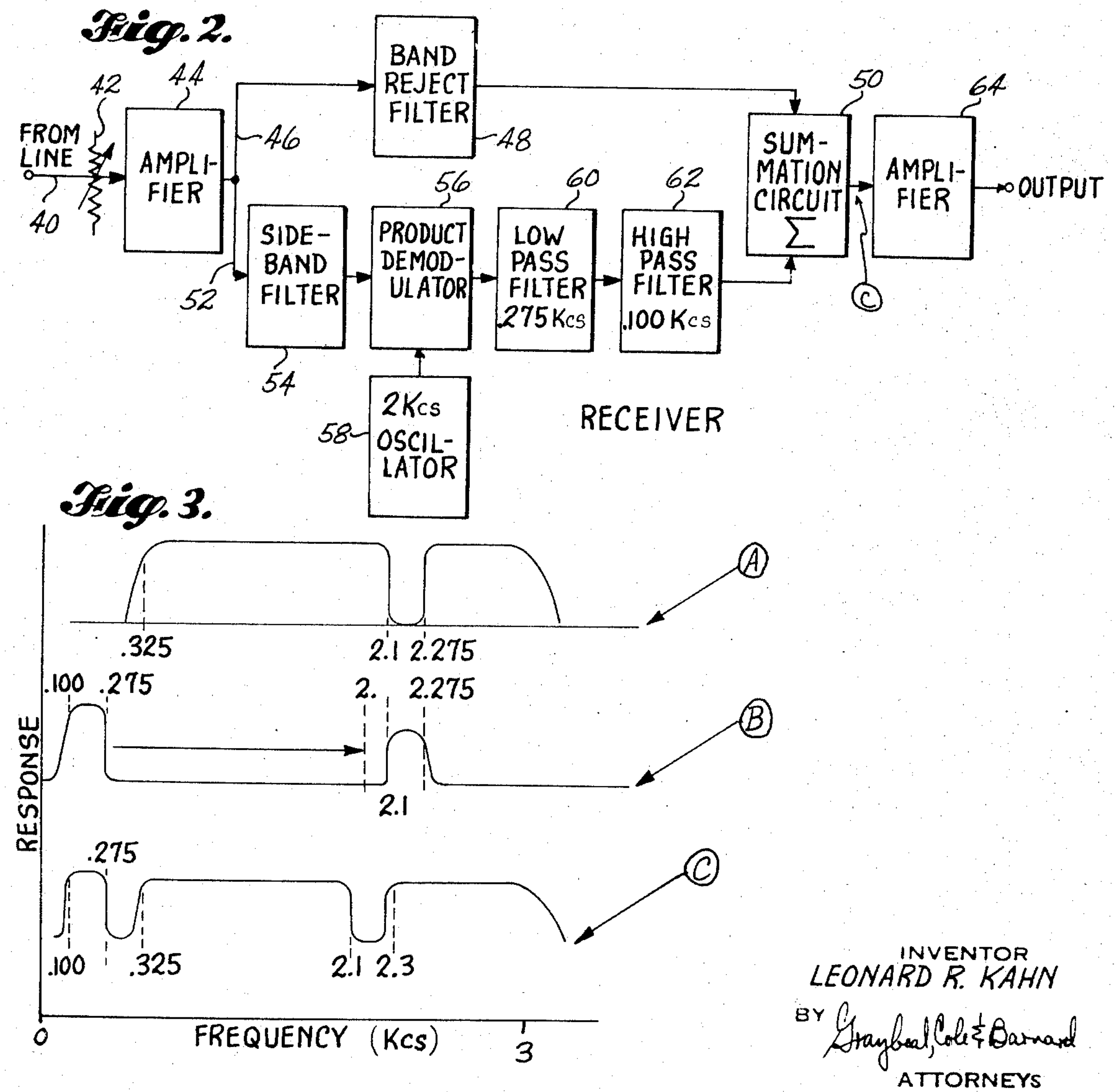
FIG. 2 is a block diagram of a preferred form of a receiving system constructed in accordance with the teachings of the present invention and adapted to receive signals transmitted by the system shown in FIG. 1.
FIG. 3 is a graphical illustration showing the frequency characteristics of the audio signal at various portions of the system shown in FIG. 1.

The second branch 52 of the receiver circuit shown in FIG. 2 includes an upper sideband filter 54 which passes frequency components between about 2.1 and about 2.275 kcs. The upper sideband filter 54 feeds a product demodulator 56 which also receives a 2 kcs carrier wave from an oscillator 58. The product demodulator thus functions to restore the frequency-displaced components of the original audio signal to their original low frequency range (i.e. 100–275 cps). The output from the product demodulator is fed to a lowpass filter 60 that passes only frequency components higher than 0.100 kcs, thereby limiting the frequency range of the signal to the original frequency range. The output signal from the high pass filter 62 is fed to the summation circuit 50 wherein it is combined with the signal from the branch 46 to substantially re-establish the original input signal components to produce the desired frequency range. The output signal from the summation circuit 50 is then fed to amplifier means 64 and to the desired utilization means (not shown), such as a loudspeaker or earphones.

FIG. 3 graphically illustrates the frequency spectrum of the input signal processed in the transmitter and receiver circuits shown in FIGS. 1 and 2. The uppermost curve "A" in FIG. 3 illustrates the signal leaving the high pass filter 20 in the branch 16 of the transmitter circuit. As shown, there is a blocked sub-band of frequencies from 2.1 to 2.275 kcs. The middle curve "B" in FIG. 3 graphically illustrates the function of the branch 26 of the transmitter circuit which translates the critical low frequency components (0.1 kcs to 0.275 kcs) to derive a signal within the blocked sub-band (2.1 kcs to 2.275 kcs).

The lowermost curve "C" in FIG. 3 illustrates the signal as it leaves the summation circuit 50 in the receiver of FIG. 2. The original low frequency components between about 0.1 kcs and 0.275 kcs are translated back to their original frequency range, and two "-holes" or block sub-bands in the frequency band of the signal occur between 0.275 and 0.325 kcs and between 2.1 and 2.275 kcs.

Figure 4:
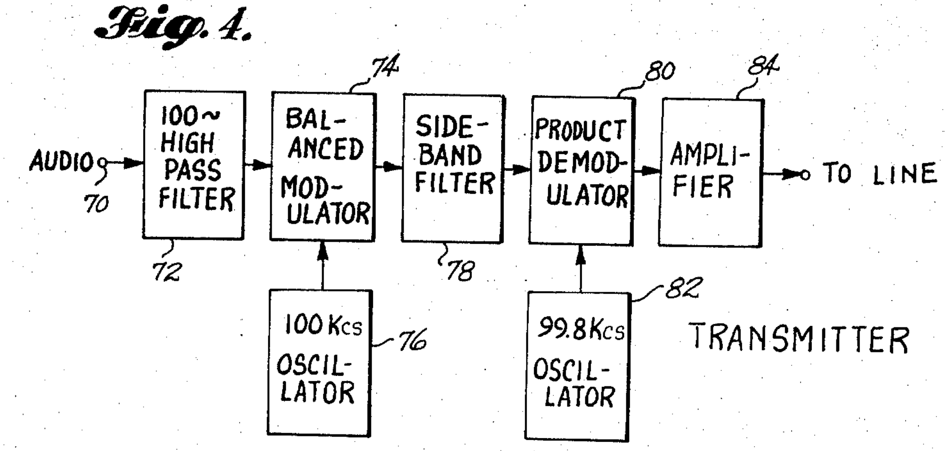
FIG. 4 is a block diagram of a modified form of a transmitting system constructed according to the teachings of this invention.
Figure 5:
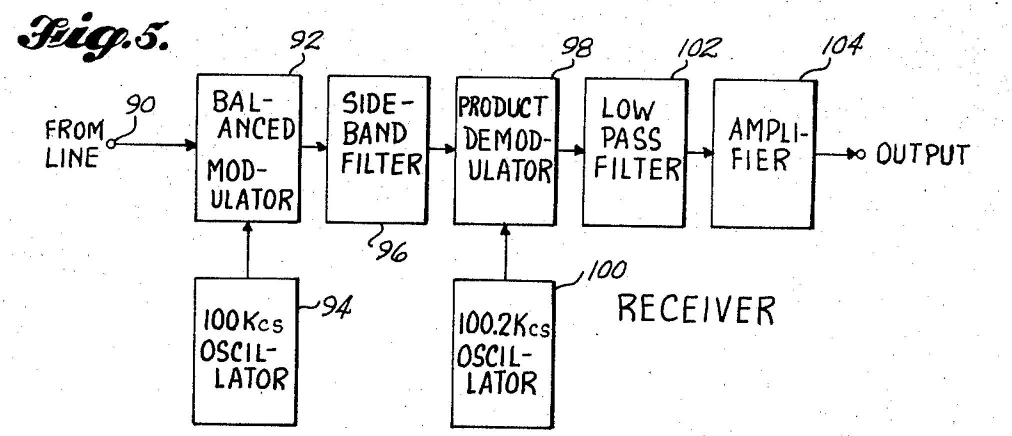
FIG. 5 is a block diagram of a modified form of a receiving system to be used in conjunction with the transmitting system shown in FIG. 4.

FIGS. 4 and 5 illustrate an alternative system for transmitting relatively high fidelity audio signals across relatively low fidelity transmission channels. In the transmitter (FIG. 4) of this system the entire audio signal is translated upward in frequency by a relatively small increment (e.g. 200 cps) so that the important low frequency component thereof fall within the passband of the low fidelity transmission channel employed. In the receiver (FIG. 5) the signal is restored to its original frequency range by translating the signal downward in frequency.

Referring to the transmitter shown in FIG. 4, an audio input signal 70 is fed through a high pass filter 72 that passes only frequency components above about 100 cps. The output from the high pass filter 72 feeds a balanced modulator 74 which also receives a 100 kcs carrier wave from local oscillator 76. The output from the balanced modulator is a 100 kcs double-sideband suppressed carrier wave. This carrier wave is then fed to a sideband filter 78 which passes only the upper sideband. The output from the sideband filter 78 is fed to a product demodulator 80 which also receives a 99.8 kcs signal from local oscillator 82. The output from the demodulator is the original audio input signal translated upwards in frequency by about 200 cps. This modified signal is then fed to amplifier 84 which amplifies the translated signal to the proper power level for application of the signal to the low fidelity transmission channel.

In the associated receiver (FIG. 5), the received signal 90 is fed to a balanced modulator 92 which also receives a 100 kcs signal from local oscillator 94. The output from the balanced modulator 92 is a 100 kcs double-sideband wave which is fed to a sideband filter 96. The sideband filter 96 passes only the upper sideband and feeds it to a product demodulator 98 which also receives a 100.2 kcs signal from local oscillator 100. The output of the product demodulator 98 is substantially the original audio input signal restored to its original frequency range, with the important low frequency components present and only the unimportant high frequency components missing. The output of the product demodulator is fed through a low pass filter 102 and an amplifier 104 where the signal is amplified to the desired power level for use in suitable utilization means (not shown).

Comparing the transmission system shown in FIGS. 1 and 2 with the system of FIGS. 4 and 5, several advantages of the former system become apparent. Where the system of FIGS. 1 and 2 are employed in a multiple receiver network, any receiver stations not equipped with reconverter circuits for restoring the upshifted low frequency components to the received audio signal to their original low frequency range will still receive an intelligible signal, since most of the signal frequencies have not been disturbed. The upshifted low frequency components translated into the blocked sub-band will produce a narrow sub-band "whistle," but such whistle can be readily tolerated since it does not materially degrade intelligibility, or it can be eliminated very simply, as by a notch filter inserted in the receiver audio signal path to block the "whistle" sub-band of frequencies and thus render nonequipped receiver stations network compatible. Where the system of FIGS. 4 and 5 are employed, however, receiver stations not equipped with reconverter circuitry would have a difficult intelligibility problem, since all frequencies of the received signal have been incrementally shifted.

As compared with the circuitry of FIGS. 1 and 2, an additional disadvantage of the system shown in FIGS. 4 and 5 is that relatively expensive sideband filters and high stability crystal oscillators are necessary in the circuits of FIGS. 4 and 5.

In a system involving only one or a few receivers per transmitter, high pass filter 20, in lieu of being in the transmitter, can be put in the receiver at any point in the signal path 40–48 (or at 48 output), in which latter position the cost of the transmitter is decreased and transmission line induced hum and low frequency noise are minimized. However, in instances where a large number of receivers are used with a given transmitter (e.g. a multi-station network), the high pass filter 20 is preferably located in the transmitter as shown.

Having thus fully described the invention, what is claimed as new and desired to be secured by Letters Patents of the United States, is:

1. A communication system providing a relatively high fidelity audio signal and an audio signal transmission channel characterized by a pass band which is narrower than and respectively transmits only a portion of the frequency components making up such relatively high fidelity audio signal, signal processing means for processing the relatively high fidelity audio signal components and improving the fidelity thereof as utilized in receiver means receiving an audio signal input only from such transmission channel, said signal processing means comprising:
   - means for eliminating a narrow sub-band of frequencies from the audio signal;
   - means translating low frequencies of such audio signals which do not fall within said pass band to obtain a frequency-displaced signal having frequency components which fall within a relatively narrow sub-band of less than 500 cps;
   - means applying such frequency-displaced signal to the relatively low fidelity transmission channel at the portion of the eliminated sub-band;
   - means receiving such frequency-displaced signal;
   - means for restoring such frequency-displaced signal to its original frequency range; and
   - a summation circuit for adding the stored frequency-displaced signal to the receiver means.

2. A communications system according to claim 1, wherein the range of frequencies blocked from the relatively low fidelity transmission channel is somewhat greater than the range of low frequencies translated in frequency to fall within the blocked sub-band frequencies.

3. A communications system according to claim 2, wherein the blocked sub-band of frequencies is in the upper midrange portion of the relatively low frequency audio signal.

4. A communication system providing a relatively high fidelity audio signal and an audio signal transmisstion channel characterized by a pass band which is narrower than and respectively transmits only a portion of the frequency components making up such relatively high fidelity audio signal components and improving the fidelity thereof as utilized in receiver means receiving and audio signal input only from such transmission channel, said signal processing means comprising:

a band rejection filter connected in series with the transmisstion channel for eliminating a narrow sub-band of frequencies therefrom;

means translating low frequencies of such high fidelity audio signals which do not fall within said pass band to obtain a frequency-displaced signal having frequency components which fall within a relatively narrow sub-band of less than 500 cps;

means applying such frequency-displaced signal to the relatively low fidelity transmission channel at the portion of the narrow sub-band;

means receiving such frequency-displaced signal;

means including a demodulator coupled to an oscillator for restoring such frequency-displaced signal to its original frequency range; and a summation circuit for adding the restored frequency-displaced signal to the receiver means.

5. A communications system according to claim 4, wherein the frequencies blocked by the rejection filter are greater than 1.5 kilocycles per second.

6. A method of transmitting a high fidelity audio signal over a low fidelity transmission line which is narrower than the high fidelity audio signal which includes the steps of:

a. attenuating a first band of frequencies from the audio signal, said first band lying within the limits of the frequencies passed by the low fidelity line;

b. separating a second band of low frequencies from the signal, said second band lying below the lowest frequency passed by the low fidelity line;

c. transferring the second band of frequencies to said first band by modulation means; and d. applying the signal minus the first and second bands of frequencies plus the transferred frequencies to the low fidelity transmitting line.

7. A method as claimed in claim 6 wherein the transmitted signal is transformed into a high fidelity signal at the other end of the line by the steps which include:

a. applying the received signal minus the first band of frequencies to a summation circuit;

b. separating the transferred frequencies from the received signal;

c. demodulating the transferred frequencies to produce the original second band of frequencies; and d. applying the second band of frequencies to the summation circuit.

* * * * *